(12) United States Patent
Takata et al.

(10) Patent No.: US 6,299,357 B1
(45) Date of Patent: Oct. 9, 2001

(54) CLUTCH BEARING FOR AUTOMOTIVE AIR CONDITIONING COMPRESSOR

(75) Inventors: Takashi Takata; Kazuo Azuma, both of Toyama (JP)

(73) Assignee: Nachi-Fujikoshi Corp., Toyama (JP)

( * ) Notice: Subject to any disclaimer, the term of this patent is extended or adjusted under 35 U.S.C. 154(b) by 0 days.

(21) Appl. No.: 09/626,483

(22) Filed: Jul. 26, 2000

Related U.S. Application Data

(62) Division of application No. 09/233,043, filed on Jan. 20, 1999, now Pat. No. 6,116,786.

(51) Int. Cl.$^7$ ........................................................ F16C 33/58
(52) U.S. Cl. ................................................................ 384/516
(58) Field of Search .................................... 384/516, 513, 384/140, 147, 537

(56) References Cited

U.S. PATENT DOCUMENTS 5,275,269   1/1994   Steele .
5,740,893 *  4/1998   Yamamoto .

FOREIGN PATENT DOCUMENTS 1257658   12/1971   (GB) .

* cited by examiner

*Primary Examiner*—Lenard A. Footland
(74) *Attorney, Agent, or Firm*—Venable; Robert J. Frank; Gabor J. Kelemen (57) ABSTRACT

An improved single-row multi-point-contact ball bearing for an electromagnetic clutch and pulley and for a compressor for an automobile air conditioner is provided, which has a low relative inclination between the inner and outer rings and rotatable at a high revolution of about 10,000 rpm, and yet inexpensive requiring a small axial space.

A single-row four-point contact angular ball bearing is provided which comprises an one-piece inner and outer rings. Each raceway surface of the inner and outer rings is made to form a Gothic-arched configuration having two curved surfaces, and each radius of curvature of the two curved surfaces is made to range substantially 0.515 to 0.55 of the outer diameter of a ball. Further, a single-row three-point contact angular ball bearing is provided which comprises an one-piece inner and outer rings, wherein at least one of the raceway surfaces of the inner and outer rings is made to form a Gothic-arched configuration having two curved surfaces, and each radius of curvature of the two curved surfaces is made to range substantially 0.51 to 0.55 of the outer diameter of a ball. And the other raceway surface of the inner and outer rings is made to have a single curved surface having a radius of curvature ranging substantially 0.505 to 0.56 of the outer diameter of the ball.

2 Claims, 8 Drawing Sheets

CLUTCH BEARING FOR AUTOMOTIVE AIR CONDITIONING COMPRESSOR

CROSS REFERENCE TO RELATED APPLICATION

This application is a division of application Ser. No. 09/233,043 filed Jan. 20, 1999, U.S Pat. No. 6,116,786.

BACKGROUND OF THE INVENTION

1. Field of the Invention

This invention relates to a ball bearing for an electromagnetic clutch and pulley and for a driveshaft of a compressor for an automobile air conditioner. The bearing comprises an inner ring secured to a fixed shaft of the compressor, an outer ring integrally and rotatably secured to the pulley of the compressor, and balls therebetween, wherein the bearing is adapted to bear a radial load by the pulley, an axial load by the electromagnetic clutch disposed adjacent the pulley and a rotational moment load owing to an offset between the centers of load of the bearing and the pulley in an axial direction.

2. Description of the Related Art

Figure 8:
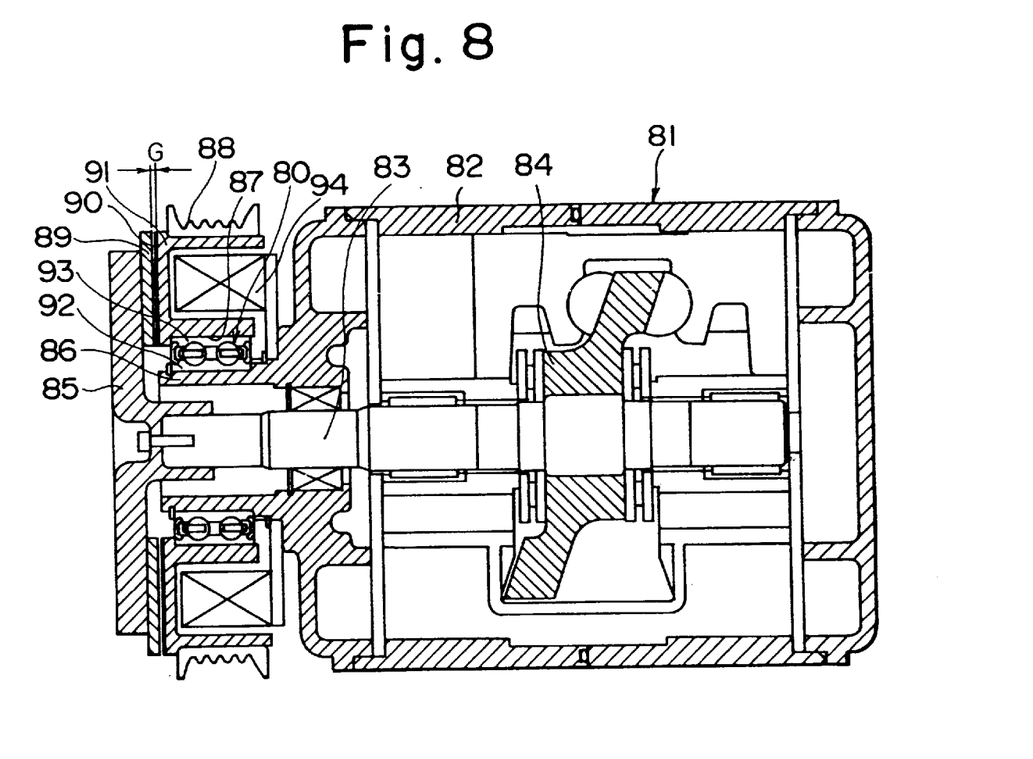
FIG. 8 is a cross-sectional view of a prior art compressor for an automobile air conditioner having a double-row angular contact ball bearing for the electromagnetic clutch and pulley and for the compressor driveshaft.

A prior art double-row ball bearing for an electromagnetic clutch and pulley and for a driveshaft of a compressor for an automobile air conditioner is shown, for example, in FIG. 8. The double-row ball bearing 80 has an one-piece inner ring 92 secured to a fixed shaft 86 protruded from a compressor housing 82 of the compressor 81, an one-piece outer ring 93 secured to an inner surface 87 of a pulley hub 91 integrally and rotatably formed with the pulley 88 of the compressor 81, and double-row balls therebetween. An electromagnetic coil windings 94 is secured to the compressor housing 82 and enclosed within the pulley hub 91. The pulley hub 91 includes a radial portion having a friction clutch surface 90 situated directly adjacent a friction clutch engagement plate 85 having an armature 89 thereon. A compressor driveshaft 83 is connected drivably to the engagement plate 85 on its free end. When the electromagnetic coil windings 94 is energized, the armature 89 is attracted toward the coil windings 94 and the clutch engagement plate 85 is engaged with the friction clutch surface 90, thus the electromagnetic clutch is engaged, and a rotational driving force by the pulley 88 is transmitted to the driveshaft 83 through the armature 89 and the engagement plate 85. The driveshaft 83 rotates a rotor fixed to it and the compressor is operated.

By such an arrangement, the bearing 80 is adapted to bear a radial load by the pulley 88 loaded by belts not shown, an axial magnetic load by an electromagnetic clutch coil windings 94 when the coil windings 94 is energized. Usually, due to limited spaces for automobile engine auxiliary parts not shown, the centers of load of the bearing 80 and the pulley 88 are offset or discrepant in an axial direction. Such offsetting of the centers of load acts a rotational moment load against the plane perpendicular to the axis of the bearing 80 to rotate the bearing 80 in an axial direction. This rotational moment load results a relative inclination between the axes of inner and outer rings 92, 93. Further, when this relative inclination become greater, an air gap G in an axial direction between the friction clutch surface 90 and the armature 89 is also enlarged, thereby results that an attractive force by the coil windings 94 is weakened. This further leads to fail an engagement between the friction clutch surface 90 and the armature 89, or due to the weakened attractive force a relative slippage therebetween occurs, causing the rotational driving force by the pulley 88 is not transmitted to the driveshaft 83, or causes to generate a heat between the friction clutch surface 90 and the armature 89. On the other hand, when this air gap G is smaller, portions of the friction clutch surface 90 and the armature 89 are made always to contact causing a generation of heat or malfunctions.

It is required that a relative inclination between the axes of inner and outer rings of a compressor bearing must be less than 0.3 degree, when the bearing is loaded with a radial load by a pulley, an axial magnetic load by an electromagnetic clutch and a rotational moment load at the same time, further, number of revolution of the bearing is required to be high revolutions of about 10,000 rpm.

By these reasons, as a ball bearing for an electromagnetic clutch and pulley and for a driveshaft of a compressor for an air conditioner, conventionally, the double-row ball bearing 80 as shown in FIG. 8, or a pair of single-row deep-groove ball bearings as shown in U.S. Pat. No. 5,275,269 is used to keep a relative inclination between the axes of inner and outer rings small when the bearing is loaded with the radial, axial and rotational moment loads at the same time. However, since the double-row ball bearing 80 or a pair of single-row deep-groove ball bearings is expensive and requires much space in an axial direction.

The inventors of this invention know that a single-row three-point-contact ball bearing as disclosed in G. B. patent No. 1257658 or a single-row multi-point-contact ball bearing including a four-point-contact ball bearing is less expensive and requires a less space in an axial direction during to the relative displacement between its both rings is small when such bearing is loaded with the above radial, axial and rotational loads at the same time. However, the inventors do not know that any one of these bearings is used for a bearing for a compressor for an air conditioner which is affected by the above radial, axial and rotational loads at the same time under a required high revolutions of about 10,000 rpm.

SUMMARY OF THE INVENTION

The object of this invention is provide a single-row multi-point-contact ball bearing for an electromagnetic clutch and pulley and for a driveshaft of a compressor for an automobile air conditioner which bearing is adapted to bear a radial load by a pulley, an axial load by an electromagnetic clutch disposed adjacent the pulley and a rotational moment load during to an offset or discrepancy between the centers of load of the bearing and the pulley in an axial direction, in which the bearing has a low relative inclination between the axes of the inner and outer rings and rotatable at high revolutions of about 10,000 rpm, and yet inexpensive as well as requiring small axial space.

The inventors of this invention have discovered that a single-row four-point-contact ball bearing may be able to bear a radial load and an axial rotational moment load, however, when these loads are loaded at the same time, since each of bearing balls cause a revolution around the bearing axis and a rotation or spin on its axis which differs from the bearing axis, each of bearing balls has a significant slide or slip between its inner and outer rings. Further, the inventors have discovered that this slide or slip is able to minimize by minimizing the generation of this slide or slip against the radial load and the axial rotational moment load.

According to the first aspect of this invention, a single-row four-point contact angular ball bearing for an electromagnetic clutch and pulley and for a driveshaft of a compressor for an automobile air conditioner is provided which comprises an one-piece inner ring secured to a fixed shaft fixed to a compressor housing of the compressor, an one-piece outer ring secured to an inner surface of a pulley hub integrally and rotatably formed with the pulley of the compressor, and balls therebetween, and the bearing is adapted to bear a radial load by the pulley, an axial load by the electromagnetic clutch disposed adjacent the pulley and a rotational moment load arising out of an offset between the centers of load of the bearing and the pulley in an axial direction. Each raceway surface of the inner and outer rings, as seen in each sectional view thereof, is made to form a Gothic-arched configuration having two opposed curved surfaces symmetric with respect to a line passing through each center of the raceway grooves, and a line joining contact points of a ball and the raceway surfaces is inclined to a transverse plane perpendicular to the bearing axis by an angle ranging substantially 15° to 35°. Further, each radius of curvature of the two curved surfaces is made to range substantially 0.515 to 0.55 of the outer diameter of a ball, and each center of curvature of the two curved surfaces of the raceway surfaces is made to situate in a direction along the line joining the contact points, beyond the center of the ball, and to a position located in the other side of the raceway, at the same length in a radial direction and offset in an axial direction with each other by a length ranging substantially 0.008 to 0.057 of the outer diameter of a ball.

By such an arrangement according to the first aspect of this invention, surface contact stresses and slides or slips generated between the raceway surfaces and bearing balls are minimized, and the generation of heat by such slides or slips is minimized accordingly. Further, the use of this single-row four-point contact angular ball bearing is able to minimize the width of the bearing significantly by about the half thereof, thereby the compressor itself also can be made compact and a significant cost-down thereof is realized. And yet the single-row four-point contact bearing has a low relative inclination between the axes of the inner and outer rings when the radial, axial and rotational moment loads under high revolutions of about 10,000 rpm.

Preferably, each center of curvature of the raceway surfaces of the two curved surfaces is made to situate in an axial direction with each other by a length ranging substantially 0.10 to 0.057 of the outer diameter of a ball, and the line joining contact points is inclined to a transverse plane perpendicular to the bearing axis by an angle ranging substantially 20° to 35°.

Since when the four-point contact angular ball bearing is operated in high speed rotations under the conditition that raceway surfaces have rough surfaces, greaseless portions occurs and micro-metal contact portions between balls and raceway surfaces are generated, resulting seizures or breakages therebetween. More preferably, the raceway surfaces of the inner and outer rings of the four-point contact angular ball bearing are superfinished to have smooth surfaces, and each bottom portion of the raceway grooves of the outer and inner ring has, as seen in each sectional view thereof, an undercut or groove, or a curved uncontacting portion formed between the two curved surfaces of the raceway surfaces, and each of undercut or groove, or uncontacting portion has a width ranging substantially 0.05~0.20 of the outer diameter of a ball, and the raceway surfaces except the undercut or groove, or uncontacting portion are superfinished. By such an arrangement, the bearing is made to operate in high speed rotations, and since the raceway surfaces except the undercut or groove, or uncontacting portion are able to superfinish in one processing, rather than processed respectively, the processing costs are reduced. Although these undercut or groove, or an uncontacting portion are not superfinished, however, since each width thereof is very narrow, no micro-metal contacts with the balls or no bad affects to the operation of the bearing occur.

The inventors of this invention also have discovered that a single-row three-point-contact ball bearing may be able to bear a radial load and an axial rotational moment load. However, when these loads are loaded at the same time, since each bearing ball cause a revolution around the bearing axis and a rotation or spin on its axis which differs from the bearing axis, each bearing ball has a significant slide or slip on the inner and outer rings, and further, this slide or slip is able to minimize by minimizing the generation of this slide or slip against the radial load and the axial rotational moment load.

According to the second aspect of this invention, a single-row three-point contact angular ball bearing which cause less slide or slip than the four-point contact angular ball bearing for an electromagnetic clutch and pulley and for a driveshaft of a compressor for an automobile air conditioner is provided which comprises an one-piece inner ring secured to a fixed shaft fixed to a compressor housing of the compressor, an one-piece outer ring secured to an inner surface of a pulley hub integrally and rotatably formed with the pulley of the compressor, and balls therebetween, and the bearing is adapted to bear a radial load by the pulley, an axial load by the electromagnetic clutch disposed adjacent the pulley and an rotational moment load arising out of an offset or discrepancy between the centers of load of the bearing and the pulley in an axial direction, wherein at least one of the raceway surfaces of the inner and outer rings is made, as seen in each sectional view thereof, to form a Gothic-arched configuration having two opposed curved surfaces symmetric with respect to a line passing through each center of the raceway grooves, and a line joining a contact point of a ball and one of the raceway surfaces and the center of the ball is inclined to a transverse plane perpendicular to the bearing axis by an angle ranging substantially 15° to 35°. Further, each radius of curvature of the two curved surfaces is made to range substantially 0.51 to 0.55 of the outer diameter of the ball, each center of curvature of the two curved surfaces of the raceway surface is made to situate in a direction along the line joining each contact point of the two curved surfaces and the center of the ball, beyond the center of the ball, and to a position located in the other side of the raceway at the same length in a radial direction and offset in an axial direction with each other by a length ranging substantially 0.008 to 0.057 of the outer diameter of the ball. And the other raceway surface of the inner and outer rings is made to have a single curved surface having a radius of curvature ranging substantially 0.505 to 0.56 of the outer diameter of the ball.

By such an arrangement according to the second aspect of this invention, this single-row three-point contact angular ball bearing is able to minimize the width of the bearing significantly by about the half thereof, the compressor itself can also be made compact and a significant cost-down thereof is realized. Further, since the other raceway surface of the inner and outer rings has a single curved surface which can be simplified to superfinish in a one processing, the processing costs are further reduced compared to the above described four-point contact angular ball bearing. And yet the single-row three-point contact bearing has a low relative inclination between the inner and outer rings when the radial, axial and rotational moment load and rotatable at a high revolution of about 10,000 rpm.

Since when the three-point contact angular ball bearing is operated in high speed rotations under the condition that raceway surfaces have rough surfaces, greaseless portions occurs and micro-metal contact portions between balls and raceway surfaces are generated, resulting seizures or breakages therebetween. Preferably, the raceway surfaces of the inner and outer rings of the three-point contact angular ball bearing are superfinished to have smooth surfaces, and the bottom portion of the raceway groove of the outer or inner ring the forming the Gothic-arched configuration having two opposed curved surfaces has an undercut or groove, or an uncontacting portion formed between the two curved surfaces of the raceway surfaces, and each undercut or groove, or uncontacting portion has a width ranging 0.05~0.20 of the outer diameter of a ball, and the raceway surfaces except the undercut or groove, or uncontacting portion are superfinished. By such an arrangement, the bearing is made to operate in high speed rotations, and since the two curved portions can be superfinished in a one processing, rather than processed respectively, the processing costs are reduced. These undercut or groove, or an uncontacting portion may not be superfinished, however, each width thereof is very narrow, no micro-metal contacts with the balls or no bad affects to the operation of the bearing occur. Additionally, since the three-point contact angular ball bearing has one-point lesser contact points relative to the four-point contact angular ball bearing, a revolution around the bearing axis and a rotation or spin on its axis, as well as generation of heat can be reduced accordingly.

BRIEF DESCRIPTION OF THE DRAWINGS

FIG. 2b is the upper half cross-sectional view of the outer ring of the bearing shown in FIG. 2a.

FIG. 2c is the upper half cross-sectional view of the inner ring of the bearing shown in FIG. 2a.

FIG. 3b is the upper half cross-sectional view of the outer ring of the bearing shown in FIG. 3a.

FIG. 3c is the upper half cross-sectional view of the inner ring of the bearing shown in FIG. 3a.

FIG. 4b is the upper half cross-sectional view of the outer ring of the bearing shown in FIG. 4a.

FIG. 4c is the upper half cross-sectional view of the inner ring of the bearing shown in FIG. 4a.

FIG. 5b is the upper half cross-sectional view of the inner ring of the bearing shown in FIG. 5a.

FIG. 6b is the upper half cross-sectional view of the outer ring of the bearing shown in FIG. 6a.

FIG. 6c is the upper half cross-sectional view of the inner ring of the bearing shown in FIG. 6a.

FIG. 7b is the upper half cross-sectional view of the outer ring of the bearing shown in FIG. 7a.

DETAILED DESCRIPTION OF THE PREFERRED EMBODIMENTS

Referring to the accompanying drawings, a detailed description of preferred embodiments of the present invention will be given hereunder.

Figure 1:
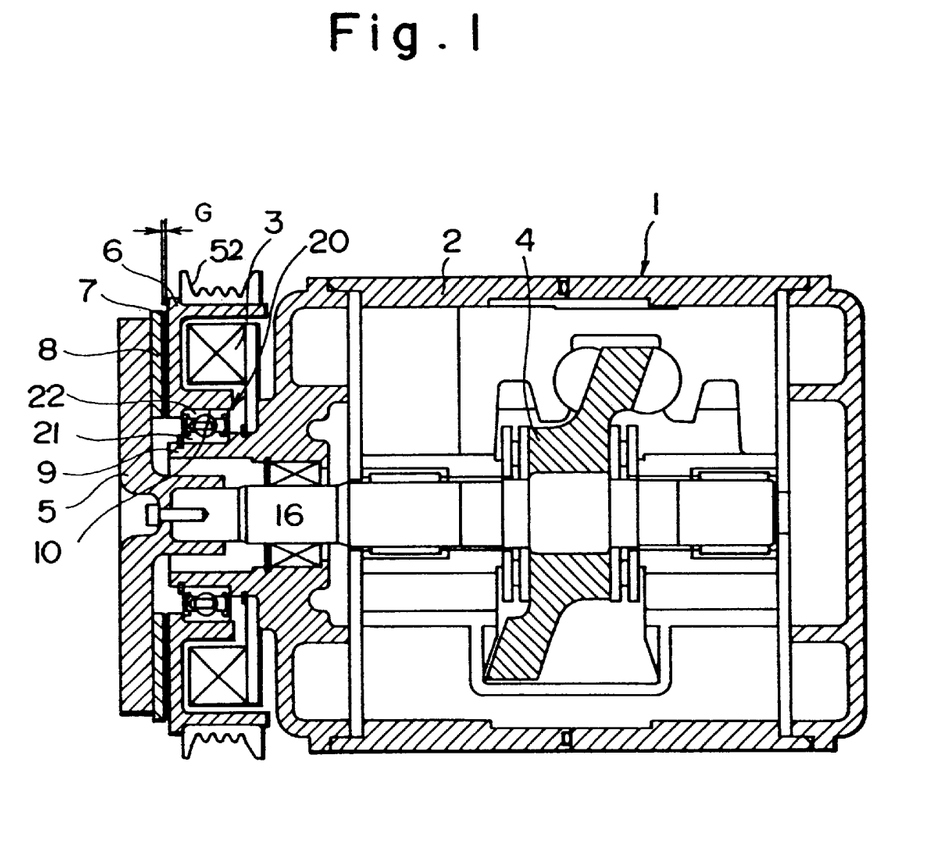
FIG. 1 is a cross-sectional view of a compressor for an automobile air conditioner having a single-row four-point contact angular ball bearing according to the first embodiment of the first aspect of this invention for the electromagnetic clutch and pulley and for the compressor driveshaft.

FIG. 1 illustrates a cross-sectional view of a compressor 1 for an automobile air conditioner having a single-row four-point contact angular ball bearing for the electromagnetic clutch and pulley and for the compressor driveshaft according to the first embodiment of the first aspect of this invention. The bearing 20 has an one-piece inner ring 21 secured to a fixed shaft 9 protruded from a compressor housing 2 of the compressor 1, an one-piece outer ring 22 secured to an inner surface 10 of a pulley hub 6 integrally and rotatably formed with the pulley 52 of the compressor 1, and singl-row balls therebetween. An electromagnetic coil windings 3 is secured to the compressor housing 2 being enclosed within the pulley hub 6. The pulley hub 6 includes a radial portion having a friction clutch surface 7 situated directly adjacent a friction clutch engagement plate 5 having an armature 8 secured thereon. A compressor driveshaft 16 is connected drivably to the engagement plate 5 on its free end. When the electromagnetic coil windings 3 is energized, the armature 8 is attracted toward the coil windings 3 and the clutch engagement plate 5 is engaged with the friction clutch surface 7, thus the electromagnetic clutch is engaged, and a rotational driving force by the pulley 52 is transmitted to the driveshaft 16 through the armature 8 and the engagement plate 5. The driveshaft 16 rotates a rotor fixed to it and the compressor 1 is operated. The friction clutch surface 7 and the armature 8 oppose with a small air gap G therebetween.

By such an arrangement, the bearing 20 is adapted to bear a radial load by the pulley 52 loaded by belts not shown, an axial magnetic load by an electromagnetic clutch coil windings 3 when the coil windings 3 is engaged. Usually, due to limited spaces for automobile engine auxiliary parts not shown, the centers of load of the bearing 20 and the pulley 52 are offset in an axial direction. Such offsetting of the centers of load acts a rotational moment load agaiinist the plane perpendicular to the axis of the bearing 20 to rotate the bearing 20 in an axial direction. This rotational moment load results a relative inclination between the axes of inner and outer rings 21, 22. Further, when this relative inclination become greater, the air gap G in an axial direction between the friction clutch surface 7 and the armature 8 also changes.

EXAMPLE 1

Figure 2A:
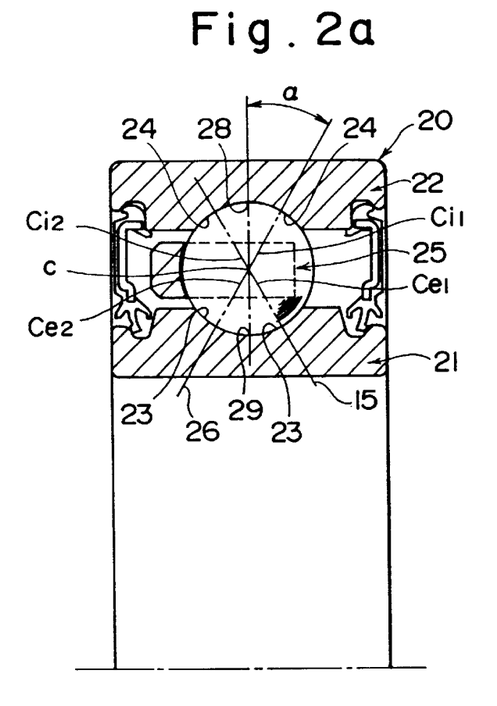
FIG. 2a is an enlarged partial upper half of the cross-sectional view of the single-row four-point contact angular ball bearing shown in FIG. 1 which is the first embodiment of the first aspect of this invention.
Figure 2B:
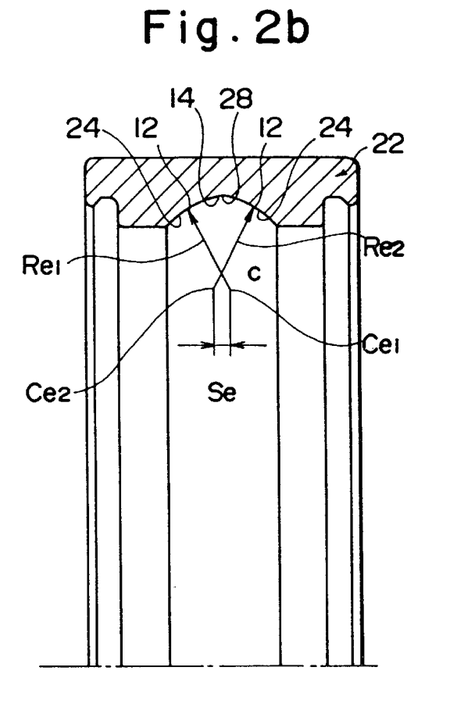
Figure 2C:
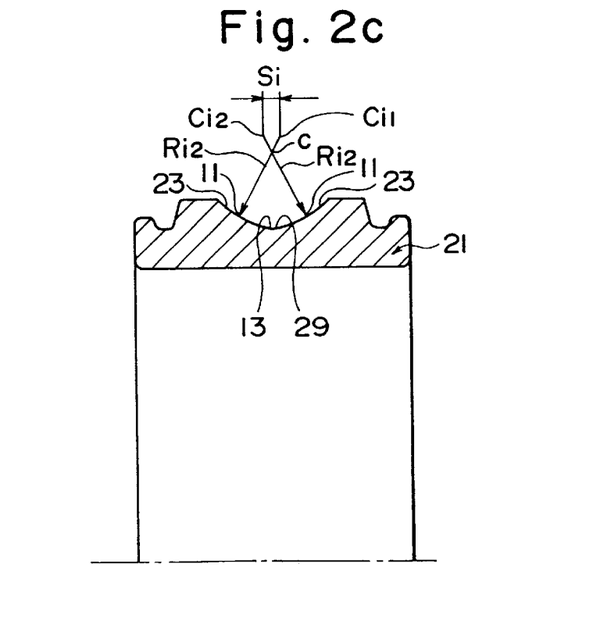

Referring to FIGS. 2a, 2b, 2c, a single-row four-point contact angular ball bearing 20 according to the first embodiment of the first aspect of this invention for an electromagnetic clutch and pulley and for a driveshaft of a compressor for an automobile air conditioner will be described as the first example. The bearing 20 has an one-piece inner ring 21, an one piece outer ring 22 and balls 25 therebetween. Each raceway surface 23,24 of the inner and outer rings 21,22 is made, as seen in each sectional view thereof, to form a Gothic-arched configuration having two opposed curved surfaces 23,23;24,24 symmetric with respect to a line passing through the centers 28,29 of the raceway grooves, and a line 26 or 15 joining contact points 12,11 of a ball 25 and the raceway surface 23, 24 is inclined to a transverse plane perpendicular to the bearing axis by an angle α (contact angle). The contact angle α is preferable to range substantially 15° to 35°. In this first example, this contact angle α is made to be 20°.

Further, preferably, each radius of curvature of the raceway surfaces of the two curved surfaces 23,23;24,24 of the inner and outer rings ranges substantially 0.515 to 0.55 of the outer diameter of the ball 25. In this first example, each radius of curvature of the two curved surfaces 23,23 of the inner ring 21 is made to be 0.52 (3.51 mm; $R_{i2}, R_{i1}$) of the outer diameter 6.747 mm of the ball 25, whereas that of the two curved surfaces 24,24 of the outer ring 22 is made to be 0.53 (3.58 mm; $R_{e2}, R_{e1}$). Each center of curvature $(C_{e2}, C_{e1})$ $(C_{i2}, C_{i1})$ of the raceway surfaces of the two curved surfaces 23,23 is made to situate in a direction along the lines 26,15 joining the contact points 12,11, beyond the center c of the ball 25, and to a position $(C_{e2}, C_{e1})(C_{i2}, C_{i1})$ located in the other sides of the raceways 23,24 at the same length in a radial direction from the axis of the bearing (not shown) and offset or discrepant in an axial direction with each other by a length Se,Si which preferably ranges substantially 0.008 to 0.057 of the outer diameter of the ball 25. In this first example, each length $(C_{i2}, C_{i1})$ in the radial direction from the axis of the bearing not shown of the inner ring 21 is made to be 20.627 mm, whereas that of each length $(C_{e2}, C_{e1})$ the outer ring 22 is made to be 20.310 mm. Further, in this first example, the length Si between the two center of curvature $(C_{i2}, C_{i1})$ in an axial direction of the inner ring 21 is made to be 0,014 of the outer diameter 6.747 mm of the ball 25, whereas that Se $(C_{e2}, C_{e1})$ of the outer ring 22 is made to be 0.021.

Preferably, each curved uncontacting area 13,14 formed between the two curved surfaces 23,23; 24,24 extends around each center 28,29 of the raceway grooves of the inner and outer rings 21,22 has a width of substantially 0.05~0.20 of the outer diameter of the ball 25. In this first example, each uncontacting area 13,14 is made to be 0.10 of the outer diameter 6.747 mm of the ball 25. Each surface of the two curved surfaces 23,23; 24,24 roughness is superfinished to have a roughness smoother than 0.8 μm Rz. Each bottom portion of the raceway grooves of the inner and outer rings 21,22 may be made to form a uncontacting area entirely, however, a part thereof may be made to form a uncontacting area.

By such an arrangement according to the first example, when the bearing 20 is loaded by a radial load and an axial rotational moment load, since contact points of each bearing ball 25 and the raceway surfaces of the two curved surfaces 23,23;24,24 consist of symmetrical four-points, as seen in FIG. 2a, a relative inclination angle between the axes of the inner and outer rings 21,22 not shown either is minimized against the axial rotational moment load, and the generation of a slide or slip is also minimized, no generation of seizures therebetween is observed.

A bench-test was performed using a four point-contact ball bearing according to the first example of this invention and applying it the same test loads as been applied on a bearing for an electromagnetic clutch and pulley and for a driveshaft of a compressor for an automobile air conditioner.

1. Measuring a relative inclination angle between the axes of the inner and outer rings of the test bearing (a) under the following bench-test conditions (b) was performed, and the inclination angle was 0.22 degree, which is a good test result less than the maximum allowable inclination angle of 0.3 degree.

(a) Test bearing; outer diameter of the outer ring 52 mm×inner diameter of the inner ring 30 mm×width 14 mm (b) Bench-test conditions:
    radial load; 50~150 kgf
    axial rotational moment load; 250~1,500 kgf-mm 2. A life or endurance test under at high speed of rotations using a test bearing (a) under the following bench-test conditions (c) was performed.

(a) Test bearing; outer diameter of the outer ring 52 mm×inner diameter of the inner ring 30 mm×width 14 mm (c) Bench-test conditions:
    radial load; 140 kgf
    axial rotational moment load; 700 kgf-mm
    number of revolutions; 9,000 rpm The test results showed that the life thereof is $4.3 \times 10^8$ revolutions, which is a good test result by six (6) time longer than that of the theoretical life $7.1 \times 10^7$ revolutions of the conventional four-point-contact ball bearing. Therefore, the bearing according to the first example is confirmed to have both sufficient ability to rotate at a high speed and durability.

EXAMPLE 2

Figure 3A:
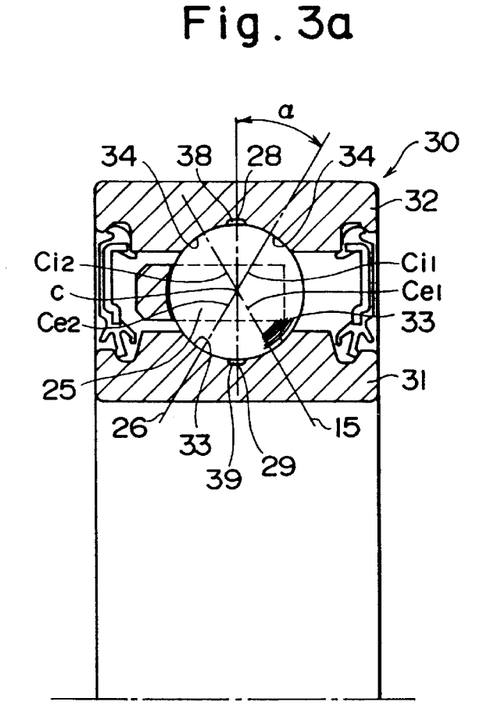
FIG. 3a is an enlarged partial upper half of the cross-sectional view of a single-row four-point contact angular ball bearing for an electromagnetic clutch according to the second embodiment of the first aspect of this invention.
Figure 3B:
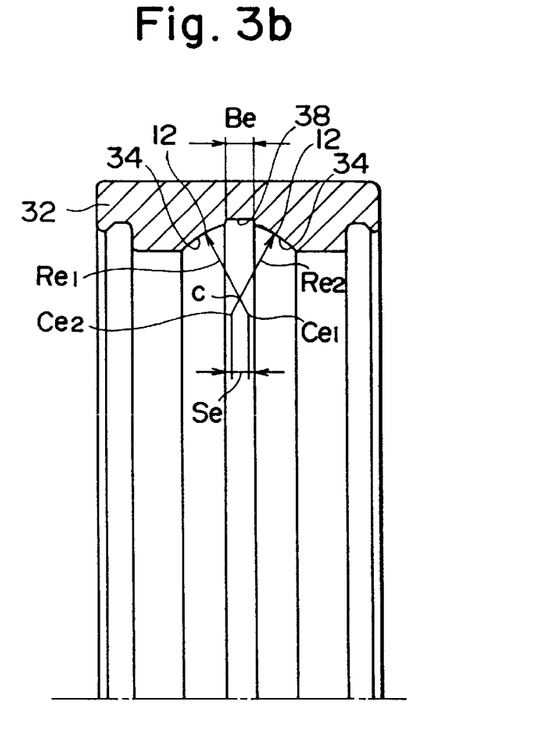
Figure 3C:
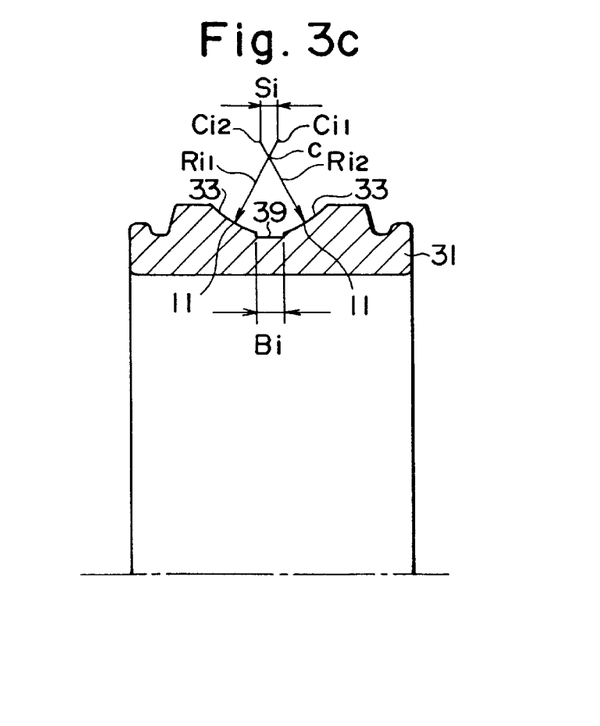

Referring to FIGS. 3a, 3b, 3c, a single-row four-point contact angular ball bearing 30 according to the second embodiment of the first aspect of this invention for an electromagnetic clutch and pulley and for a driveshaft of a compressor for an automobile air conditioner will be described as the second example. The bearing 30 is installed in the compressor on the same position as shown in FIG. 1. In the bearing 30, except that each portion of the uncontacting areas 13,14 of the bearing 20 formed between the two curved surfaces shown in FIGS. 2a, 2b, 2c is made to form an undercut or groove 38,39, the bearing 30 is similar to the bearing 20, therefore, like parts as those of the embodiment shown in FIGS. 2a, 2b, 2c will be assigned like reference numerals and the description thereof will be partly omitted.

The bearing 30 given in FIGS. 3a, 3b, 3c has an one-piece inner ring 31, an one-piece outer ring 32 and balls 25 therebetween. Each raceway surface 33,34 of the inner and outer rings 31,32 is made, as seen in each sectional view thereof, to form a Gothic-arched configuration having two opposed curved surfaces 33,33;34,34 symmetric with respect to a line passing through the centers 28,29 of the raceway grooves, and a line 26 or 15 joining contact points 12,11 of a ball 25 and the raceway surfaces 23,24 is inclined to a transverse plane perpendicular to the bearing axis by an angle α (contact angle) 25°. Each radius of curvature of the two curved surfaces 33,33 of the inner ring 31 is made to be 0.52 (3.51 mm; $R_{i2}, R_{i1}$) of the outer diameter of the ball 25, whereas that of the two curved surfaces 34,34 of the outer ring 32 is made to be 0.53 (3.58 mm; $R_{e2}, R_{e1}$), these are the same as those of the embodiment shown in FIGS. 2a, 2b, 2c. However, each center of curvature $(C_{e2}, C_{e1})(C_{i2}, C_{i1})$ of the raceway surfaces of the two curved surfaces 23,23 is made to situate in the radial direction from the axis of the bearing of the inner ring 21 is made to be 20.623 mm, whereas that of each center of curvature ($C_{e2},C_{e1}$) of the outer ring 22 is made to be 20.315 mm. Further, the length Si between the two center of curvature ($C_{i2},C_{i1}$) in an axial direction of the inner ring 21 is made to be 0,017 of the outer diameter of the ball 25 of the outer diameter 6.747 mm of the ball 25, whereas that length Se ($C_{e2},C_{e1}$) of the outer ring 22 is made to be 0,025.

Preferably, each undercut or groove 38,39 formed on the raceway grooves of the inner and outer rings 31,32 has a width of substantially 0.05~0.20 of the outer diameter 6.747 mm of the ball 25. In this second example, each undercut or groove 38,39 is made to have a width of 0.10 of the outer diameter of the ball 25. Each raceway surfaces except the undercut or groove 38,39 is superfinished to have a roughness smoother than 0.8 $\mu$m Rz.

By such an arrangement according to the second example, when the bearing 30 is loaded by a radial load and an axial rotational moment load, since contact points 11,11,12,12 of each bearing ball 25 and the raceway surfaces of the two curved surfaces 33,33; 34,34 consist of symmetrical four-points, as seen in FIG. 3a, a relative inclination angle between the axes of the inner and outer rings 31,32 is minimized against the axial rotational moment load, and the generation of a slide or slip is also minimized, no generation of seizures therebetween is observed.

A bench-test was performed using a four-point-contact ball bearing 30 according to the second example of this invention and applying it the same test loads as been applied on a bearing for an electromagnetic clutch and pulley and for a driveshaft of a compressor for an automobile air conditioner.

1. Measuring a relative inclination angle between the axes of the inner and outer rings of the test bearing (a) under the following bench-test conditions (b) was performed, and the inclination angle was 0.17 degree, which is a good test result less than the maximum allowable inclination angle of 0.3 degree.
(a) Test bearing; outer diameter of the outer ring 52 mm×inner diameter of the inner ring 30 mm×width 14 mm
(b) Bench-test conditions:
   radial load; 50~150 kgf
   axial rotational moment load; 250~1,500 kgf-mm
2. A life or endurance test under at high speed of rotations using a test bearing (a) under the following bench-test conditions (c) was performed.
(a) Test bearing; outer diameter of the outer ring 52 mm×inner diameter of the inner ring 30 mm×width 14 mm
(c) Bench-test conditions:
   radial load; 140 kgf
   axial rotational moment load; 700 kgf-mm
   number of revolutions; 9,000 rpm The test results showed that the life thereof is $3.9 \times 10^8$ revolutions, which is a good test result by five(5) time longer than that of the theoretical life $7.1 \times 10^7$ revolutions of the conventional four-point-contact ball bearing. Therfore, the bearing according to the second example is also confirmed to have both sufficient ability to rotate at a high speed and durability.

EXAMPLE 3

Figure 4A:
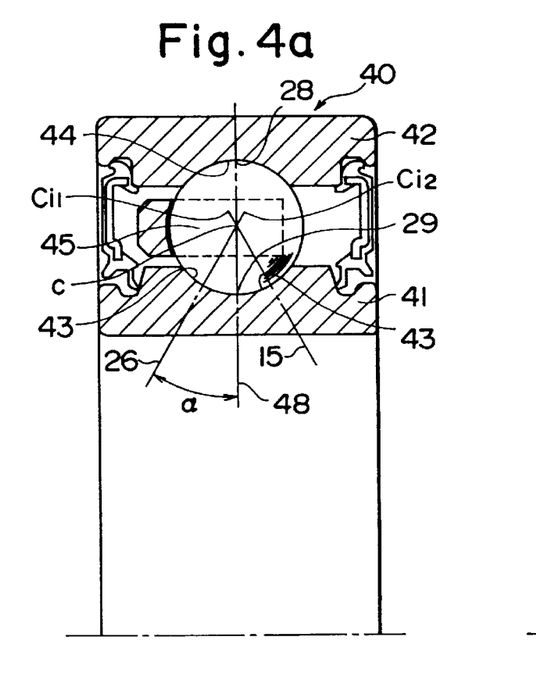
FIG. 4a is an enlarged partial upper half of the cross-sectional view of a single-row three-point contact angular ball bearing for an electromagnetic clutch according to the first embodiment of the second aspect of this invention.
Figure 4B:
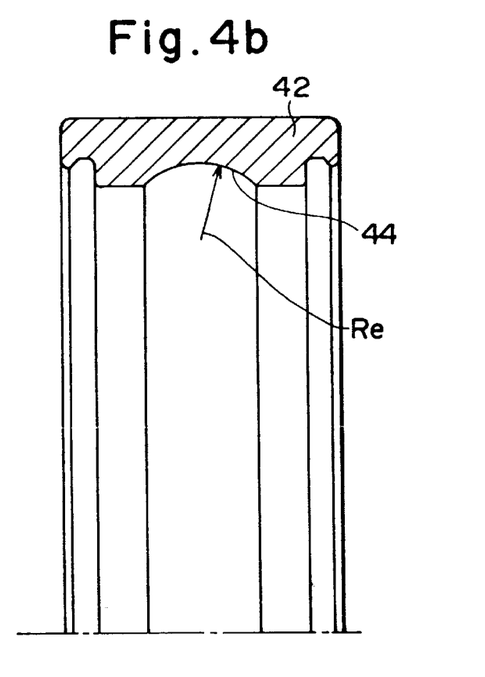
Figure 4C:
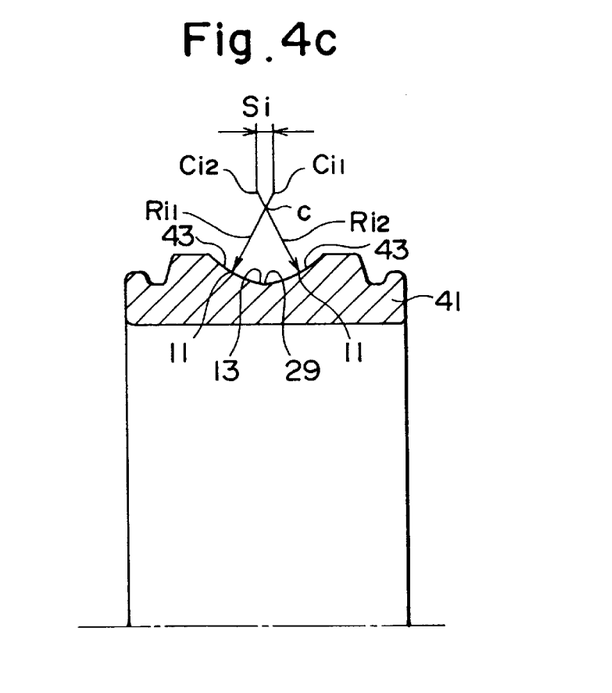

Referring to FIGS. 4a, 4b, 4c, a single-row three-point contact angular ball bearing 40 according to the first embodiment of the second aspect of this invention for an electromagnetic clutch and pulley and for a driveshaft of a compressor for an automobile air conditioner will be described as the third example. The bearing 40 is installed in the compressor on the same position as shown in FIG. 1. Therefore, like parts as those of the first example shown in FIGS. 2a, 2b, 2c will be assigned like reference numerals and the description thereof will be partly omitted.

The bearing 40 given in FIGS. 4a, 4b, 4c has an one-piece inner ring 41, an one-piece outer ring 42 and balls 45 therebetween. A raceway surface 43 of the inner ring 41 is made, as seen in each sectional view thereof, to form a Gothic-arched configuration having two opposed curved surfaces 43,43 symmetric with respect to a line passing through the centers 28,29 of the raceway grooves, and a line 15 or 26 joining one of the contact point 11 of a ball 45 and one of the two curved surfaces 43,43 of the raceway surfaces and the center c of a ball 45 is inclined to a transverse plane 48 perpendicular to the bearing axis not shown preferably by an angle (contact angle) ranging substantially 15° to 35°, and in this third example, the contact angle is made to be 20°. The bearing 40 has an outer diameter of the outer ring 42: 55 mm, an inner diameter of the inner ring 41: 32 mm and a width: 14 mm.

Preferably, the radius ($R_{i2},R_{i1}$) of curvature of the Gothic-arched two curved surfaces 43,43 is made to range substantially 0.51 to 0.55 of the outer diameter of a ball 45. In this third example, each radius ($R_{i2},R_{i1}$) of curvature of the Gothic-arched two curved surfaces 43,43 is made to be 0.52 (3.715 mm) of the outer diameter 7.144 mm of the ball 45. Each center ($C_{i2},C_{i1}$) of curvature of the Gothic-arched two curved surfaces 43,43 of the raceway surface is made to situate in a direction along the line 15,26 joining the contact points 11,11 and the center c of the ball 45, beyond the center c of the ball 45, and to a position ($C_{i2},C_{i1}$) located in the other side of the raceway 43,43 at the same length 21.885 mm in a radial direction from the bearing axis not shown, and offset in an axial direction with each other by a length ranging substantially 0.008 to 0.057 of the outer diameter of the ball 45. In this third example, the length of the offset in an axial direction is made to be 0.014.

The other raceway surface 44 of the outer ring 42 is made, as seen in each sectional view thereof, to have a single curved surface 44 having a radius Re of curvature ranging substantially 0.505 to 0.56 of the outer diameter c of the ball 45. In this third example, the radius Re of curvature is made to be 0.525 (3.750 mm) of the outer diameter 7.144 mm of the ball 45.

Preferably, an uncontacting area 13 formed between the Gothic-arched two curved surfaces 43,43 has a width of substantially 0.05~0.20 of the outer diameter of the ball 45. In this third example, the width of the uncontacting area 13 is made to be 0.10 of the outer diameter 7.144 mm of the ball 45. Each raceway surfaces 43,43,44 except the uncontacting area 13 is superfinished to have a roughness smoother than 0.8 $\mu$m Rz.

By such an arrangement of the single-row three-point contact angular ball bearing 40 according to the third example, when the bearing 40 is loaded by a radial load and an axial rotational moment load, since contact points of each bearing ball 45 and the raceway surfaces 43,43,44 consist of three-points 11,11,28, as seen in FIG. 4a, a relative inclination angle between the axes of the inner and outer rings 41,42 is minimized against the axial rotational moment load, and the generation of a slide or slip is also minimized, no generation of seizures therebetween is observed.

A bench-test was performed using a three-point-contact ball bearing 40 according to the third example of this invention and applying it the same test loads as been applied on a bearing for an electromagnetic clutch and pulley and for a driveshaft of a compressor for an automobile air conditioner.

1. Measuring a relative inclination angle between the axes of the inner and outer rings of the test bearing (e) under the following bench-test conditions (d) was performed, and the inclination angle was 0.23 degree, which is a good test result less than the maximum allowable inclination angle of 0.3 degree.
(e) Test bearing; outer diameter of the outer ring 55 mm×inner diameter of the inner ring 32 mm×width 14 mm
(d) Bench-test conditions:
    radial load; 50~150 kgf
    axial rotational moment load; 250~1,200 kgf-mm
2. A life or endurance test under a high speed of rotation using a test bearing (a) under the following bench-test conditions (f) was performed.
(e) Test bearing; outer diameter of the outer ring 55 mm×inner diameter of the inner ring 32 mm×width 14 mm
(f) Bench-test conditions:
    radial load; 150 kgf
    axial rotational moment load; 750 kgf-mm
    number of revolutions; 10,000 rpm The test results showed that the life thereof is $2.5 \times 10^9$ revolutions, which is a good test result by three(3) time longer than that of the theoretical life $8.1 \times 10^8$ revolutions of the conventional three-point-contact ball bearing. Therefore, the bearing according to the third example is also confirmed to have both sufficient ability to rotate at a high speed and durability.

EXAMPLE 4

Figure 5A:
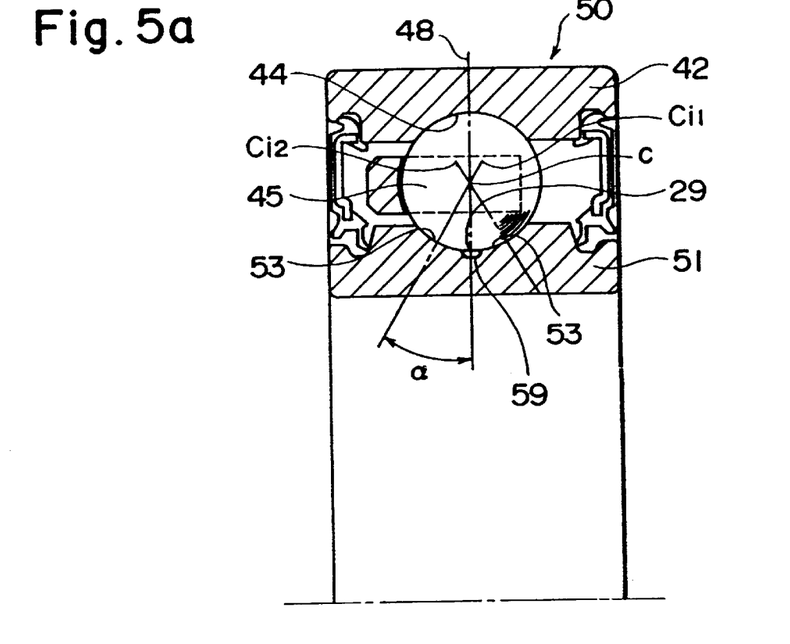
FIG. 5a is an enlarged partial upper half of the cross-sectional view of a single-row three-point contact angular ball bearing for an electromagnetic clutch according to the second embodiment of the second aspect of this invention.
Figure 5B:
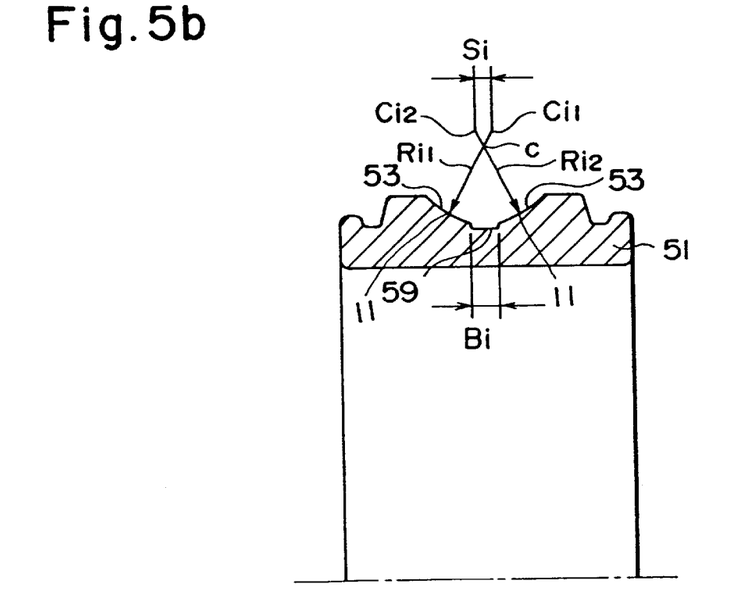

Referring to FIGS. 5a, 5b a single-row three-point contact angular ball bearing 50 according to the second embodiment of the second aspect of this invention for an electromagnetic clutch and pulley and for a driveshaft of a compressor for an automobile air conditioner will be described as the fourth example. The bearing 50 is installed in the compressor on the same position as shown in FIG. 1. Except that the portion of the uncontacting area 13 joining each two curved surfaces 43,43, shown in FIG. 4c is made to form an undercut or groove 59 of the inner ring 51 of this bearing 50, the bearing 50 is similar to the bearing 40 shown in FIGS. 4a, 4b, 4b including the dimensions of the bearing 50 (the outer diameter of the outer ring 42: 55 mm, the inner diameter of the inner ring 41: 32 mm and the width: 14 mm, the outer diameter of the ball 45: 7.144 mm), therefore, like parts as those of the third example shown in FIGS. 4a, 4b, 4c will be assigned like reference numerals and the description thereof will be partly omitted.

The bearing 50 given in FIGS. 5a, 5b has an one-piece inner ring 51, an one-piece outer ring 42 which is the same with that of FIGS. 4a, 4b, and balls 45 therebetween.

Preferably, the undercut or groove 59 formed around the bottom of the raceway groove of the inner ring 51 has a width Bi of substantially 0.05~0.20 of the outer diameter 7.144 mm of the ball 45. In this fourth example, the undercut or groove 59 is made to have a width of 0.098 (0.7 mm) of the outer diameter 7.144 mm of the ball 45. Each raceway surfaces except the undercut or groove 59 is superfinished to have a roughness smoother than 0.8 µm Rz.

By such an arrangement of the single-row three-point contact angular ball bearing 50 according to the fourth example, when the bearing 50 is loaded by a radial load and an axial rotational moment load, since contact points of each bearing ball 45 and the raceway surfaces of the two curved surfaces 53,53,44 consist of three-points 11,11,28, as seen in FIG. 5a, a relative inclination angle between the axes of the inner and outer rings 51,42 is minimized against the axial rotational moment load, and the generation of a slide or slip is also minimized, no generation of seizures therebetween is observed.

A bench-test was performed using a three-point-contact ball bearing 50 according to the fourth example of this invention and applying it the same test loads as been applied on a bearing for an electromagnetic clutch and pulley and for a driveshaft of a compressor for an automobile air conditioner.

1. Measuring a relative inclination angle between the axes of the inner and outer rings of the test bearing (e) under the following bench-test conditions (d) was performed, and the inclination angle was 0.23 degree, which is a good test result less than the maximum allowable inclination angle 0.3 degree.
(e) Test bearing; outer diameter of the outer ring 55 mm×inner diameter of the inner ring 32 mm×width 14 mm
(d) Bench-test conditions:
    radial load; 50~150 kgf
    axial rotational moment load; 250~1,200 kgf-mm
2. A life or endurance test under high speed of rotations using a test bearing (e) under the following bench-test conditions (f) was performed.
(e) Test bearing; outer diameter of the outer ring 55 mm×inner diameter of the inner ring 32 mm×width 14 mm
(f) Bench-test conditions:
    radial load; 150 kgf
    axial rotational moment load; 750 kgf-mm
    number of revolutions; 10,000 rpm The test results showed that the life thereof is $2.6 \times 10^9$ revolutions, which is a good test result by three(3) time longer than that of the theoretical life $8.1 \times 10^8$ revolutions of the conventional three-point-contact ball bearing. Therefore, the bearing according to the third example is also confirmed to have both sufficient ability to rotate at a high speed and durability.

EXAMPLE 5

Figure 6A:
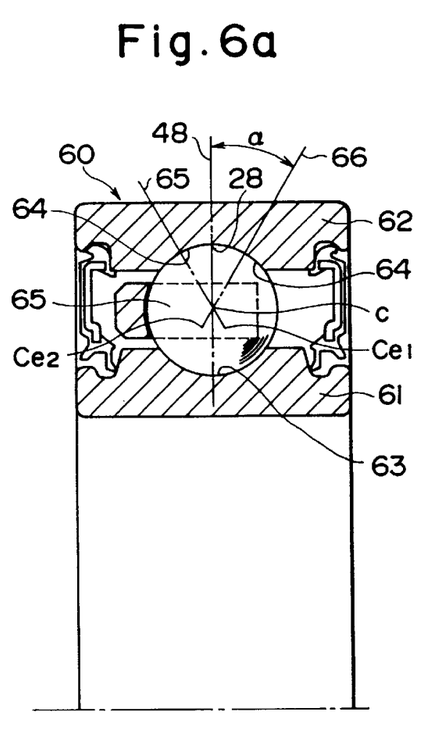
FIG. 6a is an enlarged partial tipper half of the cross-sectional view of a single-row three-point contact angular ball bearing for an electromagnetic clutch according to the third embodiment of the second aspect of this invention.
Figure 6B:
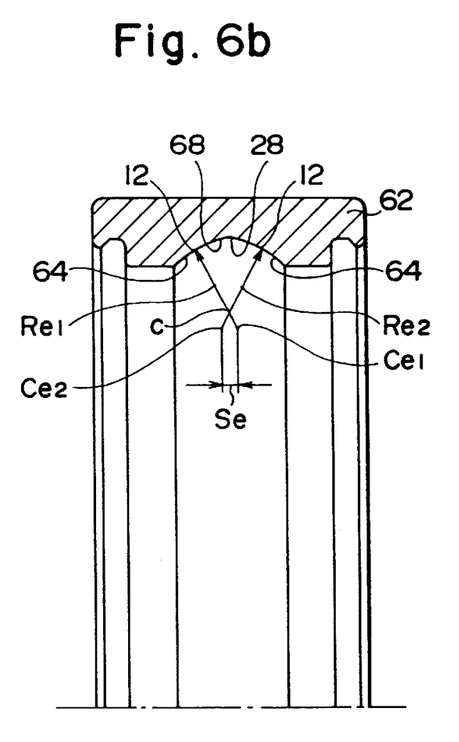
Figure 6C:
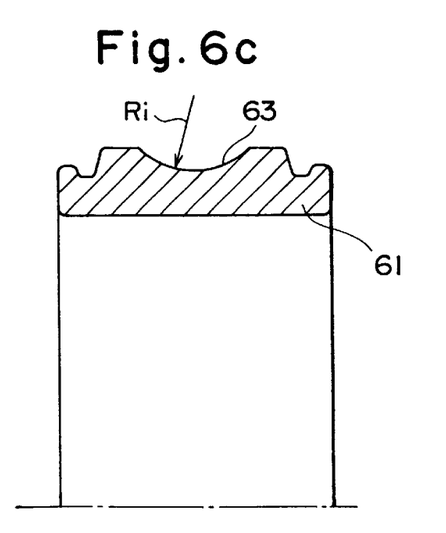

Referring to FIGS. 6a, 6b, 6c a single-row three-point contact angular ball bearing 60 according to the third embodiment of the second aspect of this invention for an electromagnetic clutch and pulley and for a driveshaft of a compressor for an automobile air conditioner will be described as the fifth example. The bearing 60 is installed in the compressor on the same position as shown in FIG. 1. Contrary to the bearing 40 shown in FIGS. 4a, 4b, 4b having an uncontacting area 13 formed on the inner ring 41, the bearing 60 shown in FIGS. 6a, 6b, 6c has an uncontacting area 68 on the outer ring 62. Other dimensions of the bearing 60 (the outer diameter of the outer ring 42: 55 mm, the inner diameter of the inner ring 41: 32 mm and the width 14 mm, the outer diameter of the ball 45: 7.144 mm) are similar to the bearing 40 shown in FIGS. 4a, 4b, 4b, therefore, like parts as those of the third example shown in FIGS. 4a, 4b, 4c will be assigned like reference numerals and the description thereof will be partly omitted.

The bearing 60 given in FIGS. 6a, 6b, 6c has an one-piece inner ring 61, an one-piece outer ring 62 and balls 65 therebetween. A raceway surface 64 of the outer ring 62 is made, as seen in each sectional view thereof, to form a Gothic-arched configuration having two opposed curved surfaces 64,64 symmetric with respect to a line 48 passing through the centers 28,29 of the raceway grooves, and a line 65 or 66 joining one of the contact points 12,12 of a ball 45 and one of the two curved surfaces 64,64 of the raceway surfaces and the center c of a ball 65 is inclined to a transverse plane 48 perpendicular to the bearing axis not shown preferably by an angle (contact angle) ranging substantially 15° to 35°, and in this fifth example, the contact angle is made to be 20°.

Preferably, the radius ($R_{e2}, R_{e1}$) of curvature of the Gothic-arched two curved surfaces 64,64 is made to range substantially 0.51 to 0.55 of the outer diameter of a ball 65. In this fifth example, each radius ($R_{e2}, R_{e1}$) of curvature of the Gothic-arched two curved surfaces 64,64 is made to be 0.53 (3.786 mm) of the outer diameter 7.144 mm of a ball 65. Each center ($C_{e2}, C_{e1}$) of curvature of the two curved surfaces 43,43 of the raceway surface is made to situate in the other side of the raceway 64,64 at the same length 21.549 mm in a radial direction from the bearing axis not shown, and offset in an axial direction with each other by a length Se ranging substantially 0.008 to 0.05 of the outer diameter of the ball 65. In this fifth example, the length of the offset in an axial direction is made to be 0.021.

The other raceway surface 63 of the inner ring 61 is made, as seen in each sectional view thereof, to have a single curved surface 63 having a radius Ri f curvature ranging substantially 0.505 to 0.56 of the outer diameter of the ball 65. In this fifth example, the radius Ri of curvature is made to be 0.508 (3.625 mm) of the outer diameter 7.144 mm of the ball 65.

Preferably, an uncontacting portion 68 formed between the Gothic-arched two curved surfaces 64, 64 has a width of substantially 0.05~0.20 of the outer diameter of the ball 65. In this fifth example, the uncontacting area 68 is made to has a width of 0.10 of the outer diameter 7.144 mm of the ball 65. Each raceway surfaces except the uncontacting portion 68 is superfinished to have a roughness smoother than 0.8 $\mu$m Rz.

By such an arrangement of the single-row three-point contact angular ball bearing 60 according to the fifth example, when the bearing 60 is loaded by a radial load and an axial rotational moment load, since contact points of each bearing ball 65 and the raceway surfaces 64,64,63 consist of three-points 11,11,29, as seen in FIG. 6a, a relative inclination angle between the axes of the inner and outer rings 61,62 is minimized against the axial rotational moment load, and the generation of a slide or slip is also minimized, no generation of seizures therebetween is observed.

A bench-test was performed using a three-point-contact ball bearing 60 according to the fifth example of this invention and applying it the same test loads as been applied on a bearing for an electromagnetic clutch and pulley and for a driveshaft of a compressor for an automobile air conditioner.

1. Measuring the relative inclination angle between the axes of the inner and outer rings of the test bearing (e) under the following bench-test conditions (d) was performed, and the inclination angle was 0.20 degree, which is a good test result less than the maximum allowable inclination angle 0.3 degree.

(e) Test bearing; outer diameter of the outer ring 55 mm×inner diameter of the inner ring 32 mm×width 14 mm (d) Bench-test conditions:
   radial load; 50~150 kgf
   axial rotational moment load; 250~1,200 kgf-mm 2. A life or endurance test under a high speed of rotation using a test bearing (e) under the following bench-test conditions (f) was performed.

(e) Test bearing; outer diameter of the outer ring 55 mm×inner diameter of the inner ring 32 mm×width 14 mm (f) Bench-test conditions:
   radial load; 150 kgf
   axial rotational moment load; 750 kgf-mm
   number of revolutions; 10,000 rpm The test results showed that the life thereof is $2.4 \times 10^9$ revolutions, which is a good test result by three(3) time longer than that of the theoretical life $8.1 \times 10^8$ revolutions of the conventional three-point-contact ball bearing. Therefore, the bearing according to the third example is also confirmed to have both sufficient ability to rotate at a high speed and durability.

EXAMPLE 6

Figure 7A:
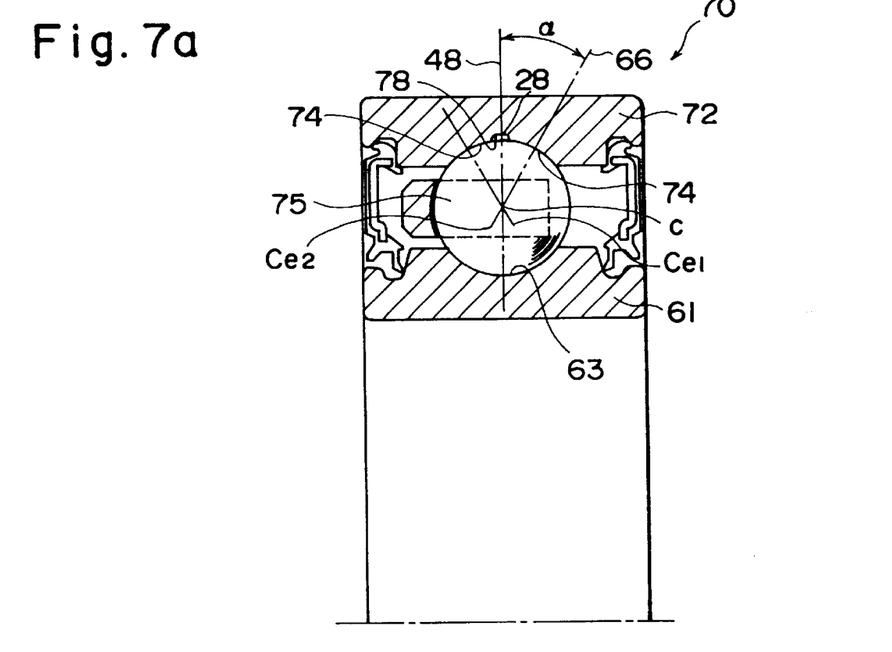
FIG. 7a is an enlarged partial upper half of the cross-sectional view of a single-row three-point contact angular ball bearing for an electromagnetic clutch according to the fourth embodiment of the second aspect of this invention.
Figure 7B:
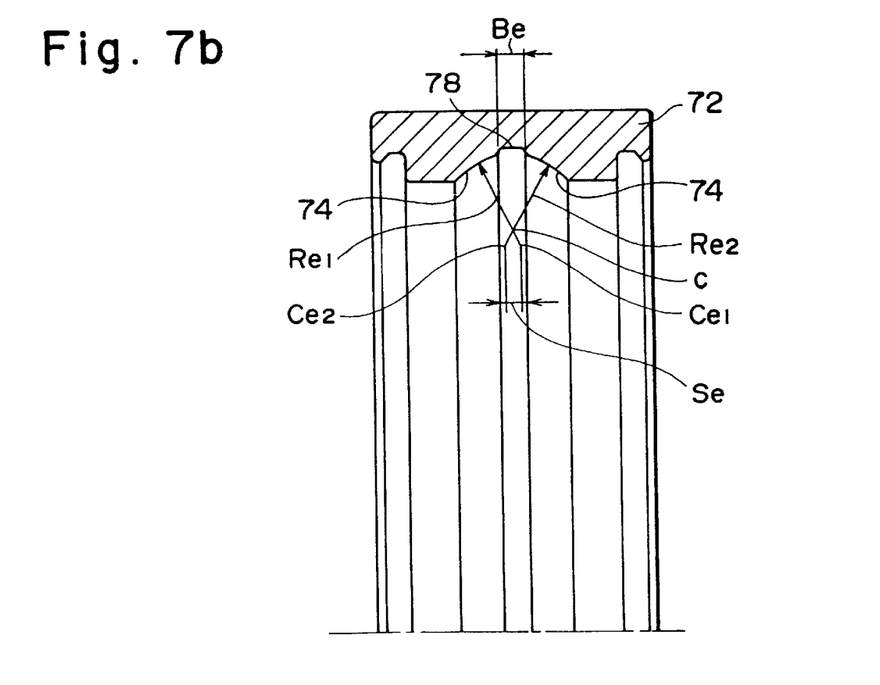

Referring to FIGS. 7a, 7b a single-row three-point contact angular ball bearing 70 according to the fourth embodiment of the second aspect of this invention for an electromagnetic clutch and pulley and for a driveshaft of a compressor for an automobile air conditioner will be described as the sixth example. The bearing 70 is installed in the compressor on the same position as shown in FIG. 1. Except that the portion of the uncontacting portion 68 shown in FIGS. 6a, 6b, 6c formed between the Gothic arched two curved surfaces is made to form an undercut or groove 78 of the outer ring 72, the bearing 70 is similar to the bearing 60 shown in FIGS. 6a, 6b, 6c including the dimensions of the bearing 70 (the outer diameter of the outer ring 72: 55 mm, the inner diameter of the inner ring 61: 32 mm and the width: 14 mm, the outer diameter of the ball 75: 7.144 mm), therefore, like parts as those of the third example shown in FIGS. 6a, 6b, 6c will be assigned like reference numerals and the description thereof will be partly omitted.

The bearing 70 given in FIGS. 7a, 7b has an one-piece inner-ring 61 which is the same with that of FIGS. 6a, 6c, an one-piece outer ring 72 and balls 45 therebetween.

Preferably, the undercut or groove 78 formed between the Gothic arched two curved surfaces 74,74 of the outer ring 72 has a width Be of substantially 0.05~0.20 of the outer diameter of the ball 75. In this sixth example, the undercut or groove 78 is made to have a width of 0.09 (0.7 mm) of the outer diameter 7.144 mm of the ball 45. Each raceway surfaces except the undercut or groove 78 is superfinished to have a roughness smoother than 0.8 $\mu$m Rz.

By such an arrangement of the single-row three-point contact angular ball bearing 70 according to the sixth example, when the bearing 70 is loaded by a radial load and an axial rotational moment load, since contact points of each bearing ball 75 and each raceway surfaces 74,74,63 consist of three-points as seen in FIG. 7a, a relative inclination angle between the axes of the inner and outer rings 61,72 is minimized against the axial rotational moment load, and the generation of a slide or slip is also minimized, no generation of seizures therebetween is observed.

A bench-test was performed using a three-point-contact ball bearing 70 according to the sixth example of this invention and applying it the same test loads as been applied on a bearing for an electromagnetic clutch and pulley and for a driveshaft of a compressor for an automobile air conditioner.

1. Measuring the relative inclination angle between the axes of the inner and outer rings of the test bearing (e) under the following bench-test conditions (d) was performed, and the inclination angle was 0.21 degree, which is a good test result less than the maximum allowable inclination angle 0.3 degree.
(e) Test bearing; outer diameter of the outer ring 55 mm×inner diameter of the inner ring 32 mm×width 14 mm
(d) Bench-test conditions:
   radial load; 50~150 kgf
   axial rotational moment load; 250~1,200 kgf-mm
2. A life or endurance test under a high speed of rotation using a test bearing (e) under the following bench-test conditions (f) was performed.
(e) Test bearing; outer diameter of the outer ring 55 mm×inner diameter of the inner ring 32 mm×width 14 mm
(f) Bench-test conditions:
   radial load; 150 kgf
   axial rotational moment load; 750 kgf-mm
   number of revolutions; 10,000 rpm The test results showed that the life thereof is $2.5 \times 10^9$ revolutions, which is a good test result by three(3) time longer than that of the theoretical life $8.1 \times 10^8$ revolutions of the conventional three-point-contact ball bearing. Therefore, the bearing according to the sixth example is also confirmed to have both sufficient ability to rotate at a high speed and durability.

What is claimed is:

1. An electromagnetic clutch and pulley arrangement for a compressor of an automobile air conditioner, the clutch and pulley arrangement comprising:

a single-row three-point contact angular ball bearing for a driveshaft of the compressor of the automobile air conditioner, a one-piece inner ring securable to a shaft fixed to a housing of the compressor, a one-piece outer ring securable to an inner surface of a pulley hub integrally and rotatably formed with the pulley of the arrangement, and balls therebetween;

wherein the bearing is adapted to bear (i) a radial load by the pulley, (ii) an axial load by the electromagnetic clutch disposed adjacent to the pulley, and (iii) a rotational moment load arising from an offset between the centers of load of the bearing and the pulley in an axial direction;

wherein one raceway surface of the inner and outer rings, as seen in a sectional view thereof, is in the form of a Gothic-arched configuration having two opposed curved surfaces symmetric with respect to a line passing through the center of the raceway surface;

wherein a line joining each pair of diametrically opposed contact points of a ball and the raceway surface is inclined to a transverse plane perpendicular to the bearing axis by an angle ranging substantially from 15° to 35°;

wherein the radius of curvature of each of the two curved surfaces of the said one raceway surface ranges substantially from 0.515 to 0.55 of the outer diameter of the ball;

wherein the center of curvature of each of the two curved surfaces of the said one raceway surface is situated in a direction along the line joining diametrically opposed contact points, beyond the center of the ball, and to a position located in the other side of the raceway, at the same length in a radial direction and offset in an axial direction with each other by a length ranging substantially from 0.008 to 0.057 of the outer diameter of a ball; and wherein the other raceway surface of the inner and outer rings has a single curved surface having a radius of curvature ranging substantially from 0.505 to 0.56 of the outer diameter of the ball.

2. An arrangement according to claim 1, wherein:

the bottom portion of one of the raceway grooves of the inner and outer ring forming a Gothic-arched configuration has, as seen in the sectional view thereof, a curved uncontacting portion which does not contact the ball between the two curved surfaces of the raceway surfaces, the uncontacting portion having a length ranging substantially from 0.05 to 0.20 of the outer diameter of the ball; and each raceway surface, except the uncontacting portion, is superfinished.

* * * * *